D. F. WILLIAMS & W. O. HERNDON.
COLLAPSIBLE POULTRY COOP.
APPLICATION FILED JULY 7, 1910.

1,008,095.

Patented Nov. 7, 1911.

Witnesses
Jas. F. McCathran
H. H. Riley

Dennis F. Williams,
W. O. Herndon, Inventors

By C. G. Siggers
Attorney

COLUMBIA PLANOGRAPH CO., WASHINGTON, D. C.

D. F. WILLIAMS & W. O. HERNDON.
COLLAPSIBLE POULTRY COOP.
APPLICATION FILED JULY 7, 1910.
1,008,095.
Patented Nov. 7, 1911.
2 SHEETS—SHEET 2.
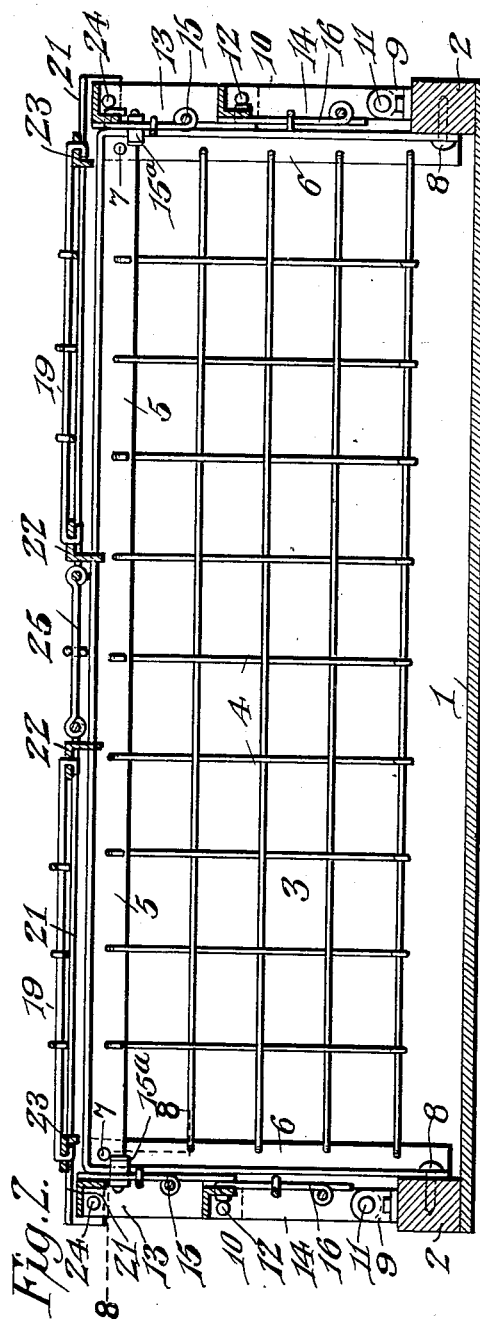
Witnesses
Jas. F. McCathran
F. F. Riley
Dennis F. Williams  Inventors
W. O. Herndon
By
C. G. Siggers
Attorney

UNITED STATES PATENT OFFICE.

DENNIS F. WILLIAMS AND WILLIAM O. HERNDON, OF FRUITVALE, TENNESSEE.

COLLAPSIBLE POULTRY-COOP.

1,008,095. Specification of Letters Patent. Patented Nov. 7, 1911.

Application filed July 7, 1910. Serial No. 570,870.

*To all whom it may concern:*

Be it known that we, DENNIS F. WILLIAMS and WILLIAM O. HERNDON, citizens of the United States, residing at Fruitvale, in the county of Crockett and State of Tennessee, have invented a new and useful Collapsible Poultry-Coop, of which the following is a specification.

The invention relates to improvements in collapsible poultry coops.

The object of the present invention is to improve the construction of collapsible poultry coops, and to provide a simple, inexpensive and efficient poultry coop of great strength and durability, adapted to be folded into a compact condition for returning it to the shipper.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a perspective view of a collapsible poultry coop, constructed in accordance with this invention. Fig. 2 is a longitudinal sectional view of the same. Fig. 3 is a transverse sectional view. Fig. 4 is a longitudinal sectional view of the coop, illustrating the arrangement of the parts when the same is collapsed. Fig. 5 is a transverse sectional view on the line 5—5 of Fig. 4. Fig. 6 is an enlarged vertical sectional view of one end of the coop, the parts being shown partially folded in dotted lines. Fig. 7 is a detail sectional view on the line 7—7 of Fig. 1. Fig. 8 is a detail sectional view on the line 8—8 of Fig. 2. Fig. 9 is a detail sectional view, illustrating a slight modification of the invention.

Like numerals of reference designate corresponding parts in all the figures of the drawings.

In the embodiment of the invention illustrated in the accompanying drawings, the folding poultry coop comprises in its construction a wooden bottom 1, provided at its ends with transverse bars or cleats 2, constructed of wood and secured to and extending across the upper face of the bottom 1 and forming supports for pivoted sides 3, consisting of a marginal metallic frame and a body portion 4 of crossed or woven wires. The marginal frame of the sides consist of a horizontal top bar 5 and vertical end bars 6, both constructed of angle iron, or other suitable material. The top bar 5, which is connected at its terminals to the upper ends of the vertical bars 6, is composed of a vertical flange or wing and an inwardly extending horizontal flange or wing, as clearly illustrated in Fig. 3 of the drawings. The vertical bars 6 are preferably formed integral with the horizontal top bar 5, the outer flange or wing being split at the upper corners of the side 3 and overlapped when the terminal portions of the material are bent to form the bars 6. The overlapped portions of the flanges or wings of the horizontal top bar 5 and the vertical bars 6 are secured together by rivets 7, or other suitable fastening devices. The vertical bars 6 have inwardly extending flanges or wings fitted at their lower ends against the inner faces of the transverse bars or cleats 2, and are connected to the same by suitable pivots 8, whereby the sides of the coop are adapted to fold inwardly between the cleats 2, as clearly illustrated in Fig. 5 of the drawings. The terminals of the wires 4 contiguous to the marginal frame are suitably secured to the bars 5 and 6.

Mounted upon the transverse bars or cleats 2 at the ends thereof are approximately L-shaped brackets 9, having upwardly extending arms or portions to which the ends 10 of the coop are secured by pivots 11. The ends 10 of the coop are composed of upper and lower sections, connected together by rivets 12 and consisting of approximately U-shaped marginal frames 13 and 14 and body portions 15 and 16 of the crossed or woven wires, suitably secured to the marginal frame. Each of the marginal frames is constructed of a single piece of angle iron, having one of its flanges split at opposite points and bent to form the horizontal top and vertical side portions of the marginal frame. The marginal frames have outwardly extending flanges, and the lower marginal frame fits within the upper marginal frame, the ends of the coop being foldable inwardly on the pivots 12, as illustrated in dotted lines in Fig. 6 of the drawings, and when they are folded to collapse the coop, they interfit and produce an exceedingly compact arrangement, and the upper and lower sections when folded occupy practically the same space. When the coop is arranged for use, the marginal frame of the upper section of the foldable end of the coop overlaps and engages the marginal frame of the lower sections and limits the swing of the sections on each other in their unfolding movement, and when the sides of the coop are swung upwardly and outwardly, the inwardly extending flanges of the vertical bars 6 fit against the inner transversely disposed flanges of the side portions of the marginal frames of the upper and lower sections of the ends of the coop and lock the same against inward movement. The sides are automatically locked in an upright position by spring catches 15ª, mounted on the side portions of the marginal frames of the upper sections of the ends of the coop and arranged on each of the corners of the latter and consisting of an outer attaching portion 16ª, an intermediate engaging portion 17, and an inner portion 18. The intermediate portion is arranged at right angles to the outer attaching portions, and the inner portion 18 is disposed at an acute angle to the engaging portion and presents an angularly disposed face to the sides of the coop to enable them to deflect and pass the engaging portions of the catches. The resiliency of the catches causes the same to automatically engage the sides and lock the same in their vertical position. The coop may be equipped with clamping screws 6ª, mounted on the foldable sides at the corners and arranged to engage the ends of the coop for rigidly clamping the sides and the ends of the coop together.

The coop is provided with a top 19 consisting of a body portion 20 of crossed or woven wire, and a supporting frame composed of angle longitudinal side bars 21, and intermediate and end transverse connecting bars 22 and 23. The side bars 21 have inwardly extending horizontal flanges and depending vertical flanges, which are connected by pivots 24 to the outer faces of the sides of the marginal frame of the top sections of the ends of the coop. This permits the top to drop down upon the ends when the latter fold inwardly. The inwardly extending top flanges of the side bars 21 fit flat against the folded ends, which are received within the angles of the side bars 21. This arrangement permits a compact folding of the top and ends. The coop is adapted to be quickly folded and unfolded, and when set up for use is automatically locked and forms a rigid structure, as the sides brace the ends and fit snugly in the angles of the side bars 21 of the top, which limit the outward swing of the sides. The intermediate and transverse connecting bars 22 and 23 are constructed of angle metal, and the top of the coop is provided between the intermediate connecting bars 22 with a hinged door 25, provided with a suitable catch for securing it in its closed position, and adapted to afford access to the interior of the coop.

Having thus fully described our invention, what we claim as new and desire to secure by Letters Patent, is:—

1. A collapsible coop comprising a bottom, foldable ends composed of upper and lower sections provided with marginal metal frames having outwardly extending flanges, the frames of the lower section of each end being pivoted between the flanges of the frame of the upper section and arranged to abut against the same whereby the sections interfit in folding inwardly and are limited in their outward or unfolding movement, a top pivotally connected with the sections of the ends, and foldable sides.

2. A collapsible coop comprising a bottom, foldable ends composed of upper and lower sections provided with marginal angle metal frames having outwardly extending flanges, the frame of the lower section of each end being pivoted between the flanges of the frame of the upper sections, whereby the sections interfit in folding inwardly and abut and are limited in their outward or unfolding movement, a top pivotally connected with the upper sections of the ends, and sides pivotally connected with the bottom and foldable inwardly and outwardly and fitting between the ends and engaged by the top when in their unfolded position.

3. A collapsible coop comprising a bottom, foldable ends composed of upper and lower sections provided with marginal angle metal frames having outwardly extending flanges, the frame of the lower sections of each end being pivoted between the flanges of the frame of the upper sections, whereby the sections interfit in folding inwardly and abut and are limited in their outward or unfolding movement, a top provided with angle side bars having depending vertical flanges pivoted to the marginal flanges of the upper sections of the ends, said side bars receiving the ends in their angles when the coop is folded, and sides pivotally connected with the bottom and foldable inwardly upon the same and fitting between the ends and engaged by the top when they are arranged in a vertical position.

4. A collapsible coop comprising a bottom, foldable ends composed of upper and lower sections provided with marginal angle metal frames having outwardly extending flanges, the frame of the lower sections of each end being pivoted between the flanges of the frame of the upper sections, whereby the sections interfit in folding inwardly and abut and are limited in their outward or unfolding movement, a top provided with angle side bars having depending vertical flanges pivoted to the marginal flanges of the upper sections of the ends, said side bars receiving the ends in their angles when the coop is folded, and sides provided with marginal angle metal frames pivotally connected with the bottom and arranged to fit between the ends of the coop and in the angles of the side bars of the top when in their vertical position.

In testimony that we claim the foregoing as our own, we have hereto affixed our signatures in the presence of two witnesses.

DENNIS F. WILLIAMS.
WILLIAM O. HERNDON.

Witnesses:
W. J. WILLIAMS,
W. G. WEDDLE.

Copies of this patent may be obtained for five cents each, by addressing the "Commissioner of Patents, Washington, D. C."